(12) United States Patent
Begin et al.

(10) Patent No.: US 9,120,625 B2
(45) Date of Patent: Sep. 1, 2015

(54) TOOL FOR HANDLING AND GROUPING TOGETHER PRODUCTS AND METHOD FOR ADJUSTING SAID TOOL

(75) Inventors: Michel Begin, Octeville-sur-Mer (FR); Eric Devaux, Octeville-sur-Mer (FR); Sébastien Damien, Octeville-sur-Mer (FR)

(73) Assignee: C.E.R.M.E.X. CONSTRUCTIONS ETUDES ET RECHERCHES DE MATERIELS POUR L'EMBALLAGE D'EXPEDITION, Corcelles-les-Citeaux (FR)

( * ) Notice: Subject to any disclaimer, the term of this patent is extended or adjusted under 35 U.S.C. 154(b) by 15 days.

(21) Appl. No.: 13/981,126

(22) PCT Filed: Jan. 20, 2012

(86) PCT No.: PCT/FR2012/050135
§ 371 (c)(1),
(2), (4) Date: Jul. 23, 2013

(87) PCT Pub. No.: WO2012/110724
PCT Pub. Date: Aug. 23, 2012

(65) Prior Publication Data
US 2013/0299310 A1        Nov. 14, 2013

(30) Foreign Application Priority Data
Feb. 15, 2011 (FR) .................................... 11 51219

(51) Int. Cl.
*B65G 47/26* (2006.01)
*B65G 17/00* (2006.01)
(Continued)

(52) U.S. Cl.
CPC ............ *B65G 17/005* (2013.01); *B65G 47/082* (2013.01); *B65G 47/907* (2013.01); *B65G 47/918* (2013.01)

(58) Field of Classification Search
CPC .. B65G 17/005; B65G 47/082; B65G 47/907; B65G 47/918; B25J 15/00; B25J 15/005; B25J 15/12
USPC ........................... 198/459.1, 468.3; 294/87.1
See application file for complete search history.

(56) References Cited

U.S. PATENT DOCUMENTS 3,302,967 A * 2/1967 Harris et al. .................... 294/65
4,199,050 A    4/1980 Moller
(Continued)

FOREIGN PATENT DOCUMENTS

EP        0 647 579 A1    4/1995
EP        2 048 098 A1    4/2009
(Continued)

*Primary Examiner* — William R Harp
(74) *Attorney, Agent, or Firm* — Sughrue Mion, PLLC

(57) ABSTRACT

A tool for handling and grouping products aligned one behind another and separated by a given spacing. The tool has a row of supports, each able to carry a grasping element for grasping a product, the supports mounted to move on a rail, each support connected to an adjacent support by an attachment. The attachment includes a rod that connects two adjacent supports and a member for locking the position of at least one of the two adjacent supports on the rod. The locking member can be deactivated to adjust the distance between two supports to the distance between two products. The mechanism for grouping together includes at least one cylinder, the cylinder including a body fixed on a support and a rod.

12 Claims, 10 Drawing Sheets

(51) Int. Cl.
*B65G 47/08* (2006.01)
*B65G 47/90* (2006.01)
*B65G 47/91* (2006.01)

(56) References Cited

U.S. PATENT DOCUMENTS

| | | | |
|---|---|---|---|
| 4,892,183 A * | 1/1990 | Fenton | 198/468.3 |
| 5,177,434 A | 1/1993 | Suzuki et al. | |
| 5,839,769 A * | 11/1998 | Slocum et al. | 294/87.1 |
| 5,931,279 A * | 8/1999 | Pedrotto et al. | 198/468.3 |
| 6,068,317 A * | 5/2000 | Park | 294/87.1 |
| 6,217,093 B1 * | 4/2001 | Neutel et al. | 294/87.1 |

FOREIGN PATENT DOCUMENTS

| | | |
|---|---|---|
| FR | 2 876 615 A1 | 4/2006 |
| FR | 2 879 179 A1 | 6/2006 |
| FR | 2 918 359 A1 | 1/2009 |
| JP | 11-245186 A | 9/1999 |

* cited by examiner

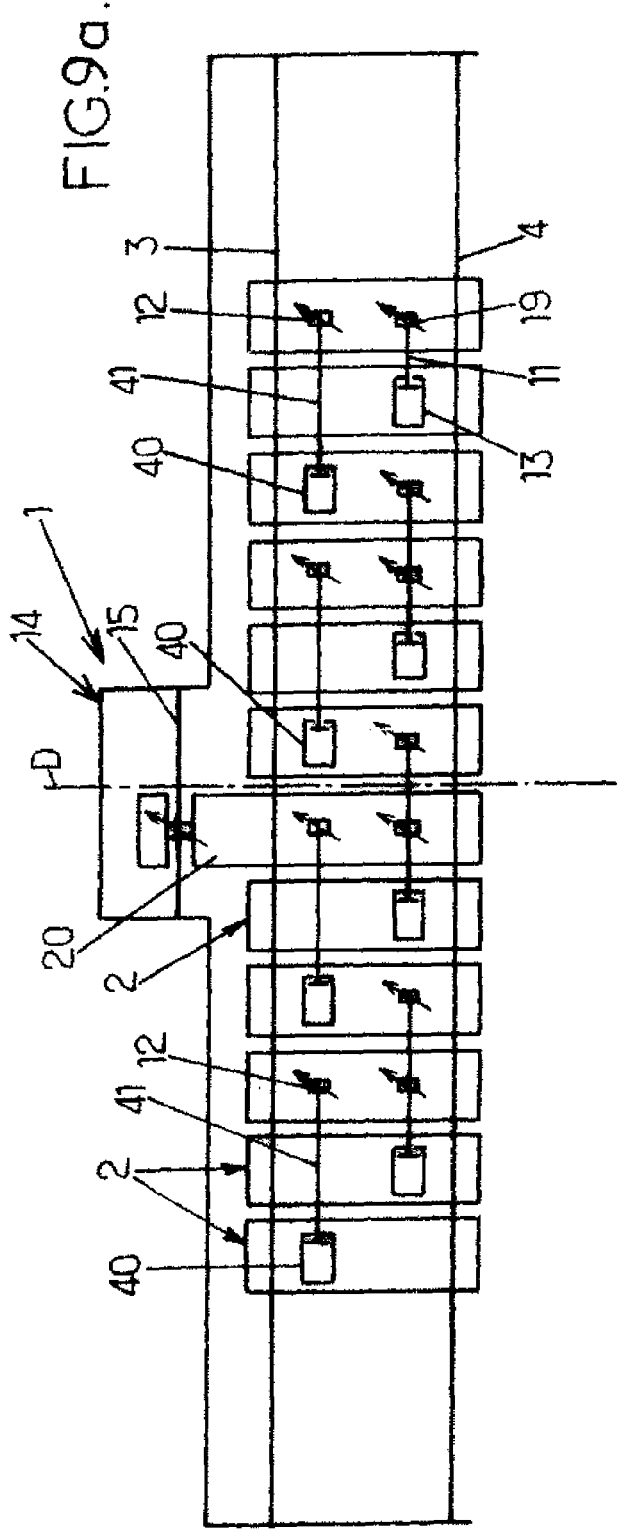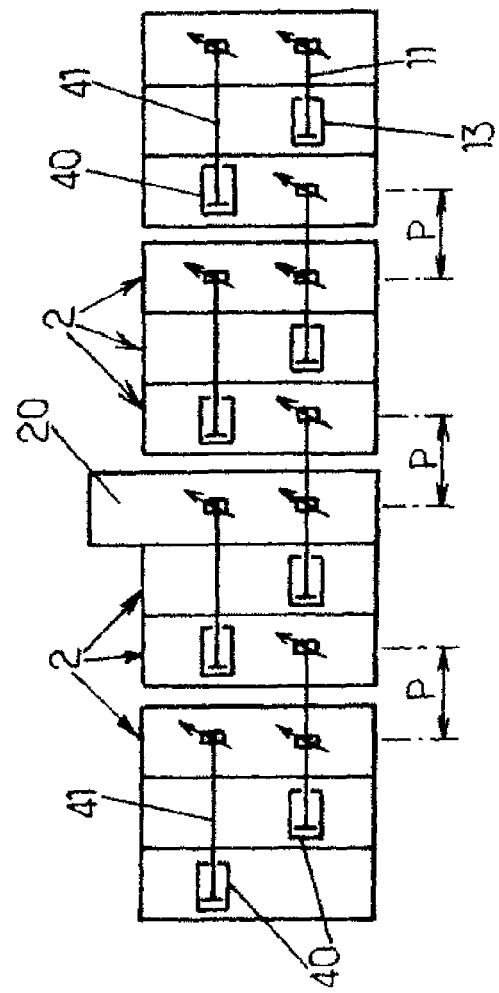

TOOL FOR HANDLING AND GROUPING TOGETHER PRODUCTS AND METHOD FOR ADJUSTING SAID TOOL

CROSS REFERENCE TO RELATED APPLICATIONS

This is a National Stage of International Application No. PCT/FR2012/050135, filed Jan. 20, 2012, claiming priority from French Patent Application No. 11 51219, filed Feb. 15, 2011, the contents of all of which are incorporated herein by reference in their entirety.

BACKGROUND

The invention relates to a tool for handling and grouping together products in preparation for packaging them in batches.

The tool of the invention is designed to be used in a conveyance installation where products aligned one behind another and separated from each other by a predetermined distance are moved from one station to another on a conveyor.

There are known installations equipped with modules for grouping products which have their base resting on the conveyor. For example, document FR 2 918 359 describes a tool for grouping bottles, vials, or the like, where the tool is in the form of a rake with teeth. When the rake is full, it shifts the batch of products arranged between its teeth to a given location where the batch is released.

Such a grouping tool demands a minimum predetermined distance between the products when they are conveyed, this minimum predetermined distance being slightly greater than the thickness of the teeth which are inserted between two consecutive products. The spaces between the teeth must correspond to the dimensions of the products which are to be inserted between the teeth of the rake. If a manufacturer wants to change the dimensions of the products to be grouped, it is necessary to change the rake.

Such a technical solution is therefore not easily adapted to changes in the shape of the products; however, such shape (design) changes are necessary in order to continue attracting consumers and/or to allow a particular use or arrangement/ storage of products.

Also known is a manipulator robot tool as described in document FR 2 876 615. Such a robot tool allows capturing entire batches of products (bottles in this case) aligned one behind another, and comprising several rows of products. Each row contains a certain number of products which are spaced apart from each other by a same fixed distance. A first row of products can be replaced by another row containing more or fewer products. To achieve this, the tool comprises rapid attachment means for the row on the body of the tool.

Such a tool, however, has the same disadvantage as the one described in document FR 2 918 359: the space between the grasping elements is not modifiable, which entails changing the row of grasping elements when the products change in shape or when their spacing on the conveyor belt is changed.

Also known, from document FR 2 879 179, is a product transfer device (conveyor) comprising a row of grasping elements which allow conveying products aligned one behind another.

The device comprises a parallelogram system connecting two adjacent elements, such that the grasping elements can move away from or draw closer to each other between a minimum distance and a maximum distance. In this manner, the products can be separated by a first distance in a first processing station and by a second distance in a second processing station.

Such a device has several disadvantages. Firstly, it does not allow setting an intermediate distance between the minimum spacing and the maximum distance allowed by the parallelogram. In addition, such a device is designed to convey products and is not suitable for the manipulation or grouping of products which are moved from one station to another while resting on their base on a conveyor and while aligned one behind another and separated from each other by a distance which can be varied, to adapt it to the minimum spacing required between two products (the spacing between two products varying according to the size and shape of the products conveyed).

BRIEF SUMMARY

The invention allows overcoming these disadvantages of prior art devices.

It concerns a tool designed to be implemented in a conveyance installation where products are moved from one station to another on a conveyor while being aligned one behind another and separated from each other by a predetermined distance. In particular, the tool of the invention adapts more easily to product changes, or to changing the distance separating two adjacent products on the conveyor, or even the amount of products which must be grasped by the tool if a manufacturer wants to change the number of products seized by the tool to create a batch. For example, the tool of the invention can be designed to adapt to manipulating a quantity of between 2 and 16 aligned and conveyed products.

For this purpose, the invention concerns a tool for handling and grouping products which are aligned one behind another and which are separated by a given spacing, said tool comprising a row of supports which are each able to carry a grasping element for grasping a product, the supports being mounted so as to be able to move on at least one rail, each support being connected to an adjacent support by attachment means. The attachment means each comprise a rod connecting two adjacent supports and also a member for locking the position of at least one of the two adjacent supports on the rod, it being possible to deactivate the locking member in order to adjust the distance between two supports to said distance between two products.

In the invention, the tool is noteworthy in that the grouping means comprise at least one cylinder, said cylinder comprising a body attached to a support and a rod, the rod of the cylinder being the rod of said attachment means.

Such an embodiment allows setting different lengths (different spacings) between the grasping element supports, in particular by fixing the locking member onto the rod of said at least one cylinder.

On the one hand, this allows easily adapting the tool so that it can handle products spaced closer together or further apart on the conveyor. As a result, the tool does not have to be changed or parts of the tool do not have to be disassembled in order to adapt it for handling different products. The tool is designed to adapt to a change of the products it handles.

On the other hand, the cylinder serves as an actuating device, ensuring the displacement of the rod relative to the rail, which ensures a movement (parallel to the rail) of the grasping heads which are attached to the rod of the cylinder. Groups of grasping heads, and consequently groups of products, can thus be created.

The tool of the invention may also comprise the following characteristics, separately or in combination:

at least one of the supports for grasping elements can be connected to a frame comprised in the tool;

said at least one support can be mounted so that it is able to move relative to said frame, and the tool can comprise means for locking in position said at least one support connected to the frame. The function of this is to center an odd number of batches in the axis of the tool;

the locking means can comprise a pneumatic lock;

the supports can be mounted so as to move transversely to the rail, between an active position and a retracted position, and the tool comprises means for locking the supports in the retracted position. This allows choosing the number of supports necessary for the desired tool application: the tool therefore does not impose a certain number of supports for handling or grouping products; and the tool may comprise means for grouping at least two supports to form at least two groups of supports.

The invention also relates to a method for adjusting said tool as defined above.

In the invention, the method may comprise the following characteristics:

it includes the following steps:
  a) bringing the supports closer together so they press against each other on each side of the tool axis;
  b) moving at least one positioning finger along a rail facing said tool,
  c) positioning said finger opposite a first support,
  d) moving the tool or the finger substantially vertically such that said finger is engaged with said support,
  e) moving, substantially horizontally, the finger engaged with said support over a predetermined distance along the rail, said distance corresponding to said spacing between two products,
  f) setting said locking member on the rod connecting a support to another adjacent support,
  g) moving the tool or the finger vertically to disengage said finger from the support,
said steps a) to f) being conducted for each support;
said step c) can first be carried out for a support located at an end of the row of supports;
the method can make use of two positioning fingers, the two fingers moving symmetrically on said rail relative to an axis of said tool;
the method can consist of using a jig comprising as many positioning fingers as the tool comprises supports for grasping elements, and said adjustment is implemented by said following steps:
  i) placing the jig under said tool,
  ii) engaging each respective support with a corresponding positioning finger of the jig,
  iii) setting locking members on each of the rods connecting two supports, and
  iv) disengaging the jig.

The invention also relates to an adjustment device which allows carrying out the method according to the invention.

The adjustment device is noteworthy in that it comprises a rail on which at least one positioning finger is movably mounted, and means for controlling the movement of the finger on said rail.

Moreover, the device can comprise two positioning fingers, at least one of the two fingers being retractably mounted.

Lastly, the invention relates to an installation comprising a tool for handling and grouping as defined above, possibly also comprising the adjustment device according to the invention.

BRIEF DESCRIPTION OF THE DRAWINGS

The invention is disclosed in a sufficiently clear and complete manner in the following description and the accompanying drawings to enable its execution. In the drawings:

FIGS. 9a and 9b show another variant positioning of the attachment means on the supports of the tool according to the invention, which allow creating groups of products different from those shown in FIG. 8;

In the following description, the terms "lower", "upper", "top", "bottom", etc. are used in reference to the drawings, for ease of understanding.

DETAILED DESCRIPTION

Figure 1:
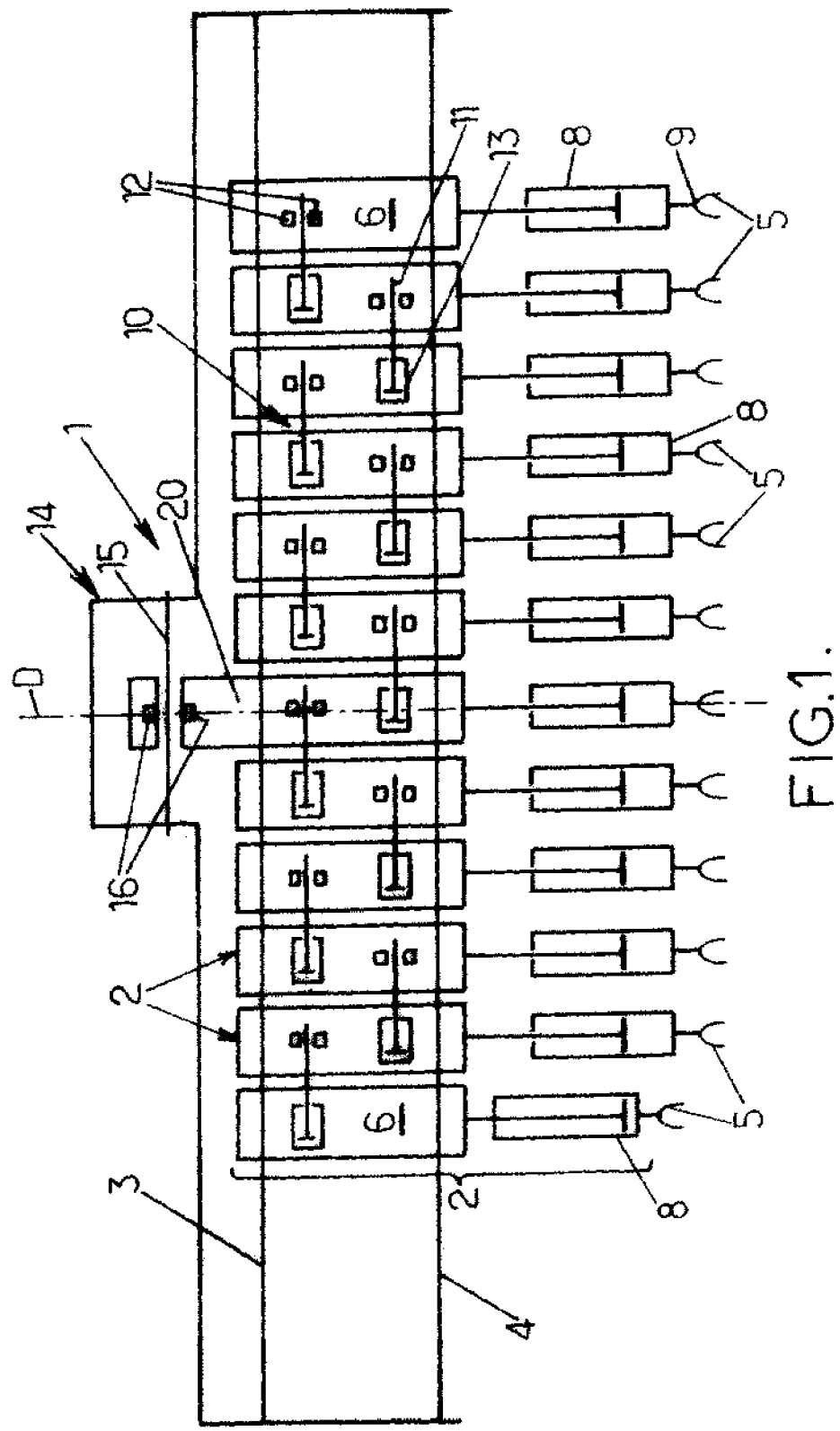
FIG. 1 schematically illustrates a front view of a tool according to a first embodiment of the invention, before the locking members are affixed.

FIG. 1 shows a handling tool 1 according to the invention. The tool 1 allows handling and grouping the products which arrive beneath it in alignment one behind another and at equal distances from one another. The distance separating two adjacent products is referred to below as the "spacing".

The products have not been represented in the figures in order to simplify the representation. A person skilled in the art will, however, know how to place them under the tool, as this is conventional, for example in the manner described in documents FR 2 918 359 and FR 2 876 615 cited above.

The tool 1 comprises a row of supports 2, which are mounted so that they can move on two rails 3 and 4. The rails 3 and 4 are parallel.

Figure 2:
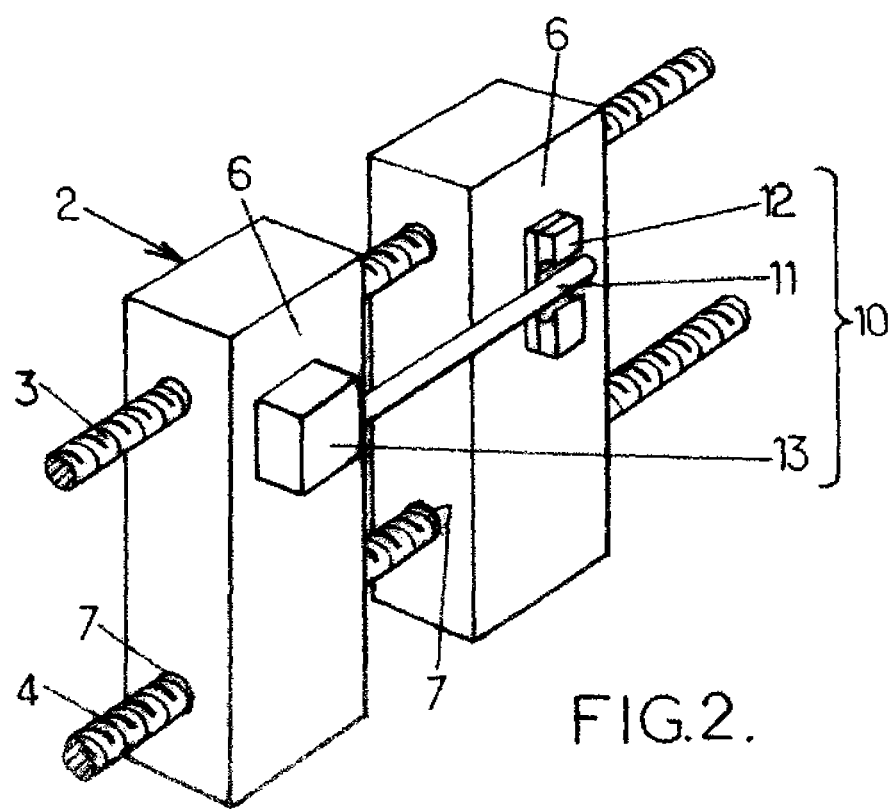
FIG. 2 shows a side perspective view of two supports of the tool shown in FIG. 1, carrying the attachment means of the invention.

To allow the supports 2 to move on the rails 3 and 4, the supports 2 comprise a substantially parallelepipedic body 6, having two through-holes 7, the through-holes 7 being spaced apart in a manner such that the bodies 6 can be threaded on the rails 3 and 4, as shown in FIG. 2.

Each support 2 is able to carry a grasping element 5 for grasping a product.

To do this, the parallelepipedic bodies 6 are connected to cylinders 8, the cylinders 8 being aligned with each of the bodies 6 of the supports 2.

At the end of each cylinder 8 is a means 9 for affixing an element 5 able to grasp a product. This element is, for example, a clamp, a suction cup, etc.

The affixing means 9 are not represented in detail, and can be realized by any means known to a person skilled in the art.

It is understood that the supports 2 could be connected to the product capturing elements 5 by any means other than cylinders 8. Cylinders 8 were chosen here in order to allow the retraction of a grasping element 5, for example when the number of grasping elements needed to form one or more batches (depending on the user's choice) does not correspond to the number of grasping elements 5 that the tool has. Other means for achieving this retraction could therefore be implemented without exceeding the scope of the invention.

According to the invention, each support 2 is connected to an adjacent support 2 by attachment means 10.

As can be seen in FIG. 1, the attachment means 10 each comprise a rod 11, which connects two adjacent supports, as well as a locking member 12 which locks the position of at least one of the two adjacent supports 2 on the rod 11. The locking member 12 can be deactivated, meaning that it can be detached from the rod 11 after attachment.

The locking member 12 thus allows adjusting the distance between two supports to a predetermined distance and therefore, if desired, to a predetermined spacing between two products. The locking member 12 also allows changing the distance between two supports, because it can be deactivated.

In FIG. 1 the locking member 12 is represented by two small squares, each schematically representing a jaw. To fix the locking member 12 on the rod 11, the jaws are tightened around the rod 11 and kept in position by locking means, for example a pin (see reference 19 below).

As a concrete example, the locking member 12 used can be a pneumatic lock.

In the context of this embodiment, the rod 11 is a rod of a cylinder 13 of which the body is fastened to a support 2, preferably adjacent to the support 2 to which the locking member 12 is fixed.

The purpose of using a cylinder is to be able to group the supports in a manner that creates groups of products, as will be seen below in reference to FIGS. 8 and 9.

The flat surface of the parallelepipedic bodies 6 of the supports 2 allows easy and conventional attachment, for example by screwing, of the cylinder 13 and the locking member 12.

Moreover, one of the supports 2 is connected to a frame 14 comprised in the tool 1.

More particularly, a support 20 is mounted so as to move on a third rail 15 attached to the frame 14. The position of the support 20 on the rail 15 can be locked by the locking means 16 which may, for example, also be implemented as a pneumatic lock (similarly to member 12).

The rails 3 and 4 are also attached by their ends to the frame 14. The rails 3, 4 and 15 are parallel to each other.

The movement of the support 20 on a third rail 15 allows moving together all the linked supports 2 relative to the axis $\underline{D}$ of the tool 1. This allows, for example, distributing the supports or groups of supports symmetrically on each side of the axis $\underline{D}$ of the tool, as will be seen below.

As was seen above, the supports 2 comprise cylinders 8 having devices 9 mounted at their ends for affixing the grasping elements 5.

The cylinders 8 have the function of lowering or raising the product grasping elements 5. Implemented in this manner, the supports 2 can move transversely to the rails 3 and 4, between a position where they allow the grasping elements 5 to grasp a product, or a retracted position where the grasping elements 5 cannot grasp a product.

The tool 1 comprises means for locking the supports in the vertical retracted position. These are, for example, cylinder control means known to a person skilled in the art, or pneumatic locks.

Figure 3:
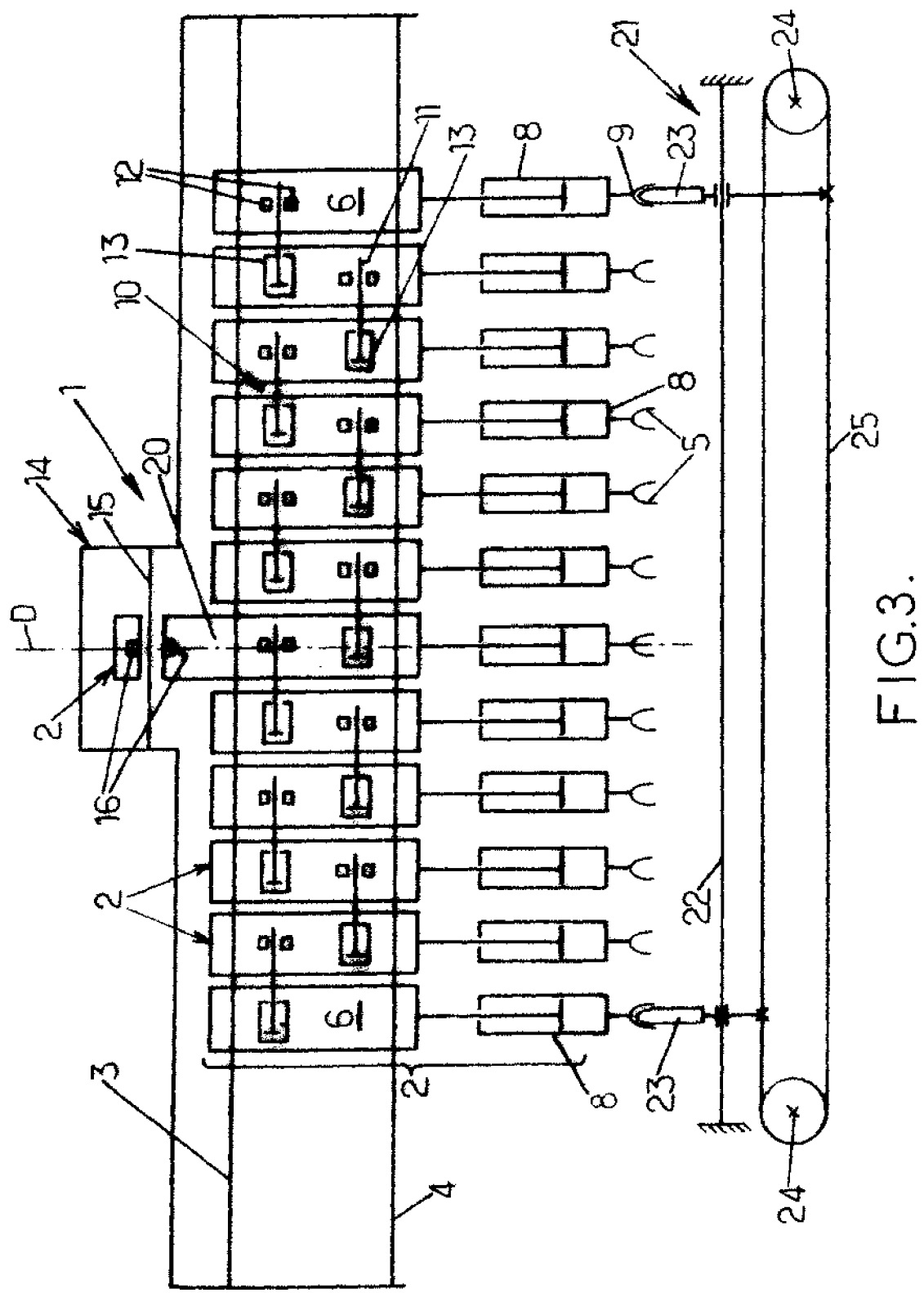
FIG. 3 illustrates the tool of FIG. 1 at the moment of the first step of the adjustment method according to the invention, as well as an adjustment device according to the invention.
Figure 4:
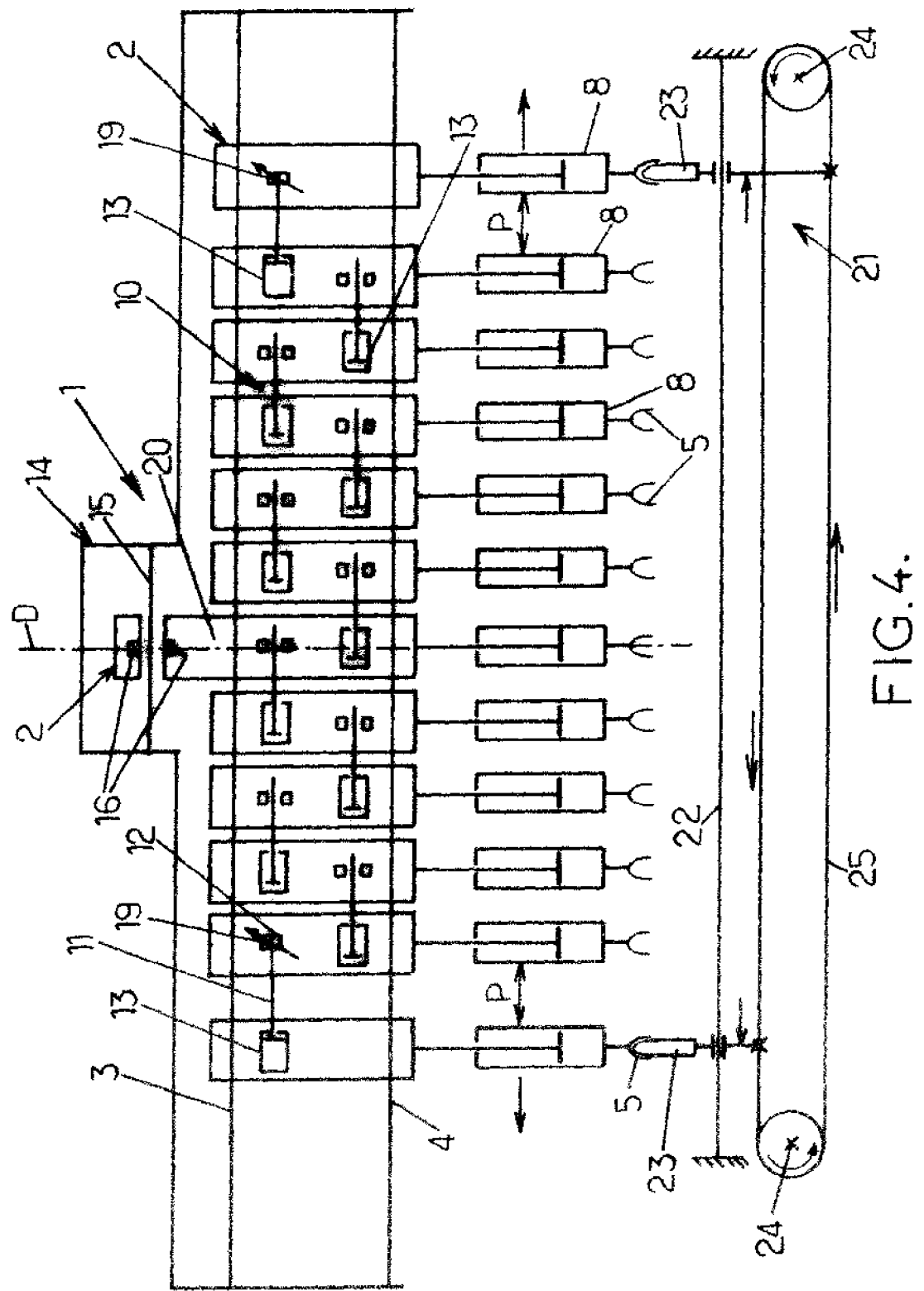
FIG. 4 illustrates the tool of FIG. 1 at the moment of the second step of the adjustment method according to the invention.
Figure 5:
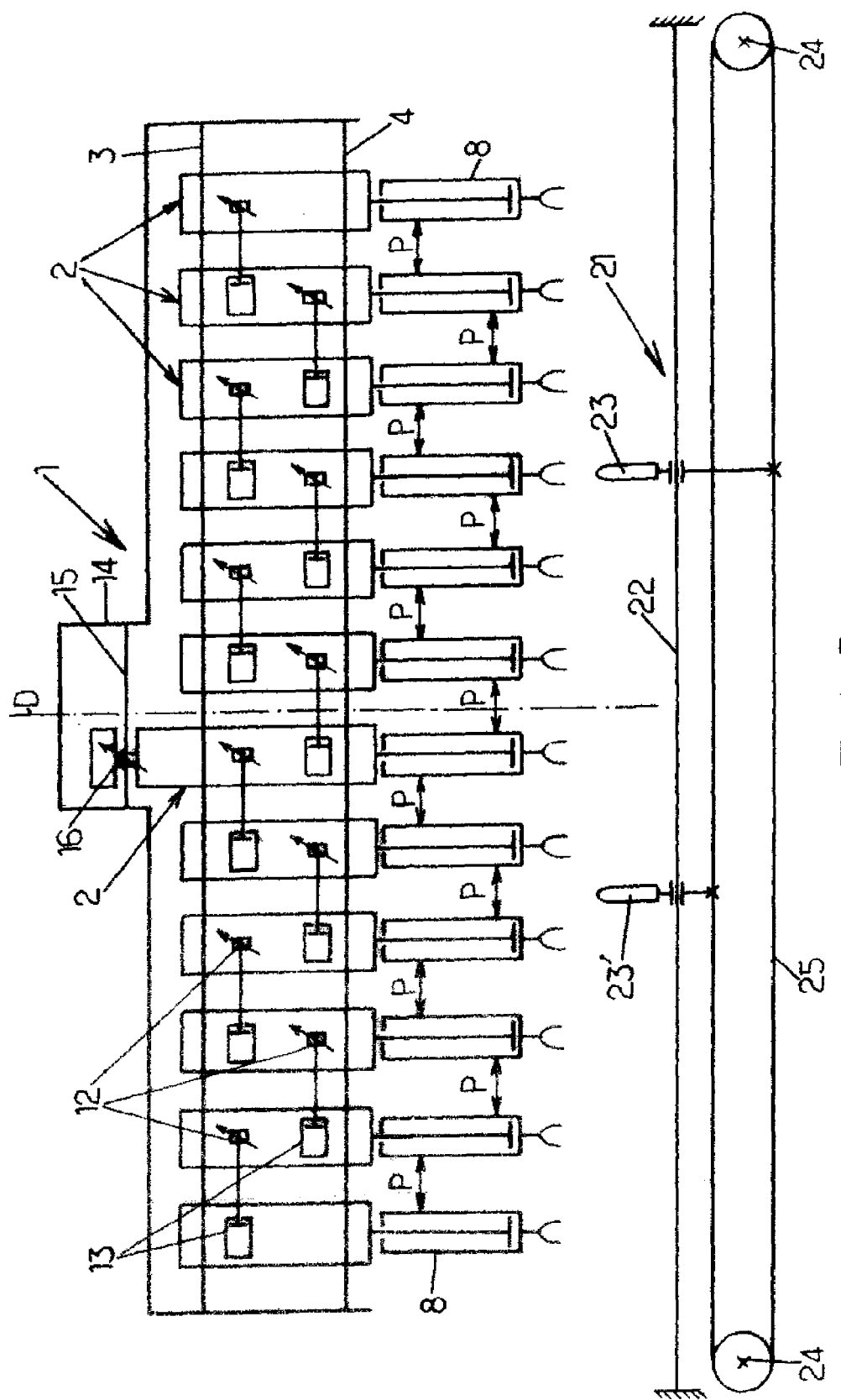
FIG. 5 illustrates the tool of FIG. 1, after all distances between the tool supports have been adjusted.

FIGS. 3 to 5 will now be referred to while describing a method for adjusting the tool 1 represented in 1, as well as an adjustment device which allows carrying out the adjustment method.

As can be seen in FIGS. 3 to 5, an adjustment device 21 comprises a rail 22, on which is mounted at least one positioning finger 23. In this case, in the context of this embodiment, the device 21 comprises two positioning fingers 23 which are mounted so that they can move on the rail 22.

The movement of the fingers 23 occurs symmetrically relative to the axis $\underline{D}$ of the tool 1. To achieve this, the two fingers 23 are connected to an endless belt 25 mounted so that its path has two axes 24.

The endless belt 25 thus presents two parallel bands moving in opposite directions when the belt is in motion.

Each finger is attached to a band such that, when the belt 25 is advanced, the two fingers draw closer to each other or move away from each other simultaneously (see FIG. 4).

The endless belt 25 mounted on two axes 24 thus constitutes a means for controlling the movement of the fingers 23 on the rail 22.

To adjust and set the spacing between each of the supports 2 of the tool 1, one proceeds in the following manner.

Firstly, all the supports 2 are pressed against one another towards the D axis of the tool 1.

Then the two positioning fingers 23 are moved along the rail 22 which is facing the tool 1, until they are positioned so that each one is opposite a support 2, and in particular opposite a gripping element 5 carried by the support 2.

In the context of this embodiment, the positioning fingers 23 are moved to be aligned with the supports 2 located at the ends of the row of supports 2 carried by the tool.

Once the fingers 23 positioned in this way, the tool is moved vertically so that the fingers 23 engage with the grasping elements 5 of the supports 2, and therefore engage with the supports 2 (see FIG. 3).

One will note that the grasping elements 5 have shapes that are complementary to those of the ends of the positioning fingers 23.

The next step consists of moving the fingers 23, engaged with the supports 2, over a predetermined distance along the rail 22.

The predetermined distance can correspond to the spacing between the products to be grasped.

With the fingers 23 engaged with the grasping elements 5 of the supports 2, the supports 2 are moved along the rails 3 and 4, in a manner that is symmetrical relative to the axis $\underline{D}$ of the tool.

When the supports 2 have been moved by a distance corresponding to the spacing $\underline{P}$, the locking members 12 are actuated on each of the rods 11 (tightening the jaws of the locking member 12), or a pin 19 can be placed to keep the jaws of the locking member 12 locked in position. The pin 19 is removable.

The tool 1 is then raised, to disengage the fingers 23 from the grasping elements 5.

Each of the steps described above is then repeated for the adjacent supports 2, as many times as are necessary.

As was explained above, one support 20 is movably mounted on the rail 15. Its position on the rail 15 is fixed by actuating the locking means 16 such that the supports 20 of the tool 1 are distributed symmetrically relative to the axis D of the tool 1. In effect, depending on whether the tool comprises an odd or even number of supports 2, the supports are not distributed in the same manner relative to the axis D of the tool 1. It is by moving the support 20 on the rail 15 and actuating the locking means 16 that a symmetrical distribution of supports 2 on each side of the axis D of symmetry is achieved.

One of the fingers 23 is used to move the support 20 on the rail 15. The other finger 23 must not come into contact with any of the grasping elements 5. To achieve this, one of the elements 23 can be removably mounted, or mounted to move vertically (or retractable), such as the finger denoted 23' in FIG. 5. In this manner, element 23' can engage with a grasping element 5, while element 23 cannot (because it is retracted relative to element 23').

One will note in FIG. 5 that each of the supports 2 is separated from an adjacent support 2 by a predetermined distance corresponding to the spacing P between the products to be grasped.

One will also note that each of the locking members 12 is locked into position on each of the rods 11 of the cylinders 13, and that the position of the support 20 is locked on the rail 15 due to actuation of the locking means 16.

Figure 6:
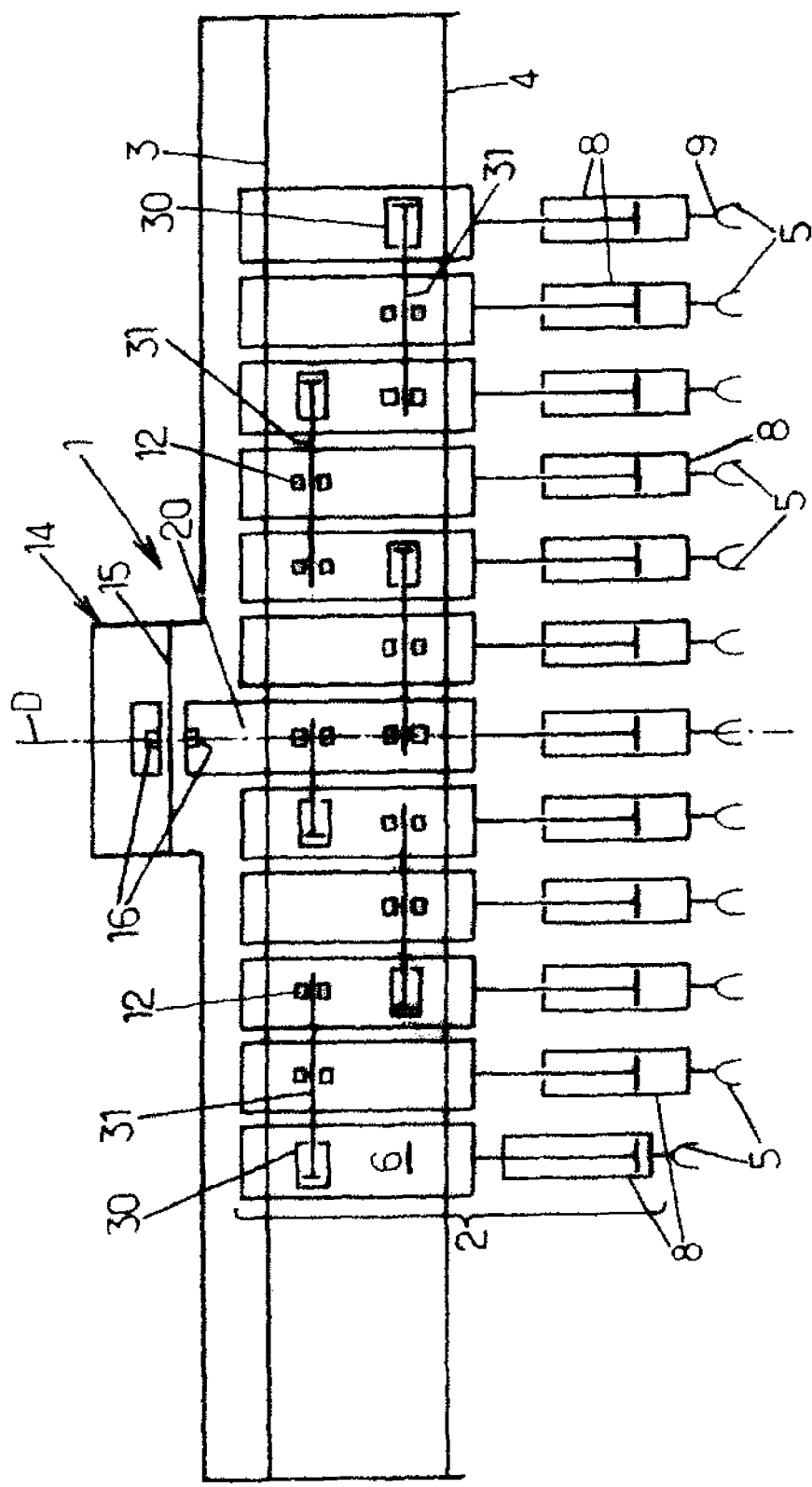
FIG. 6 shows the tool according to the invention, with the attachment means positioned differently than in the preceding figures.
Figure 7:
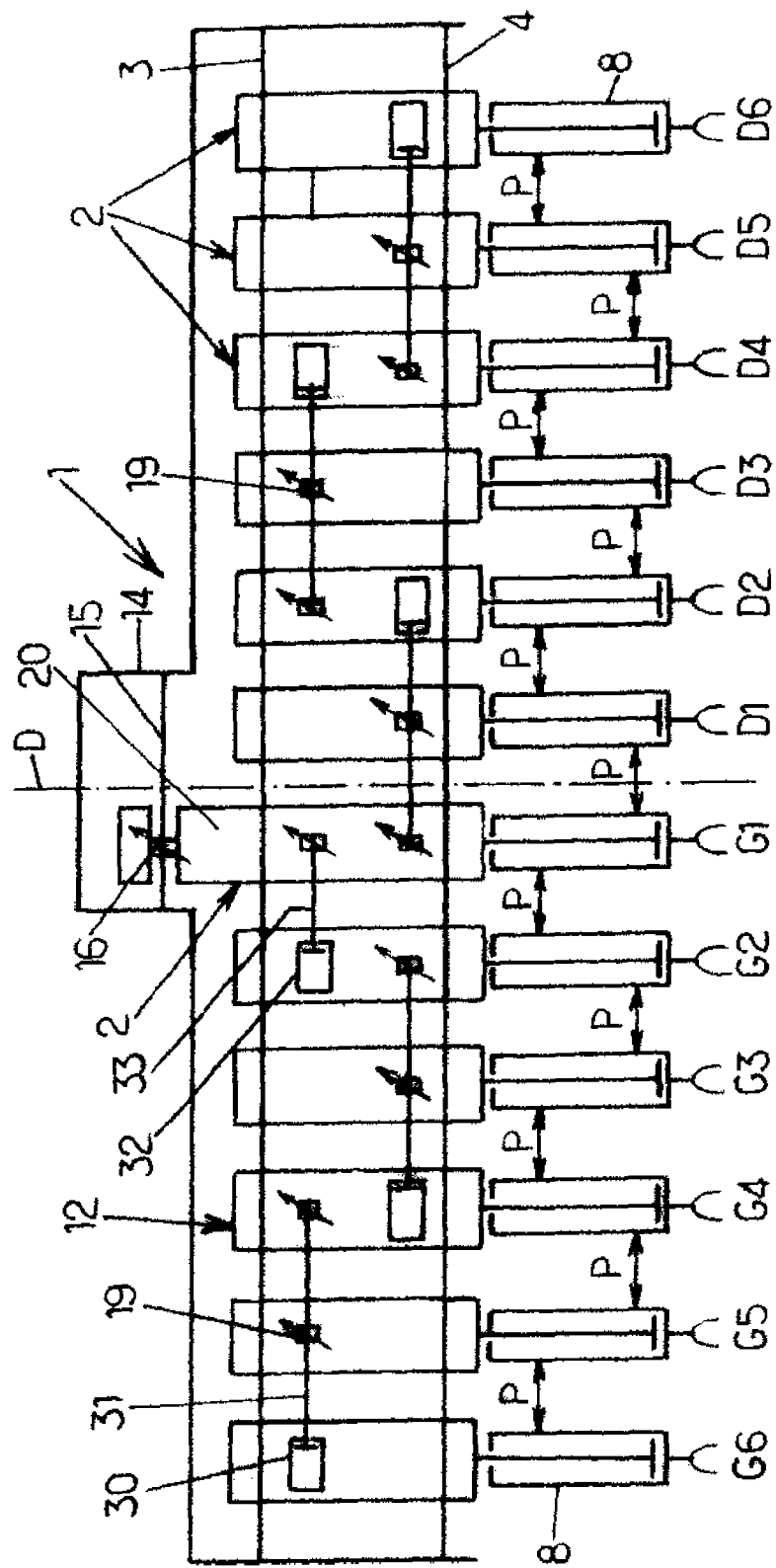
FIG. 7 illustrates the tool equipped with the attachment means shown in FIG. 6, after all the distances between the tool supports have been adjusted.
Figure 8:
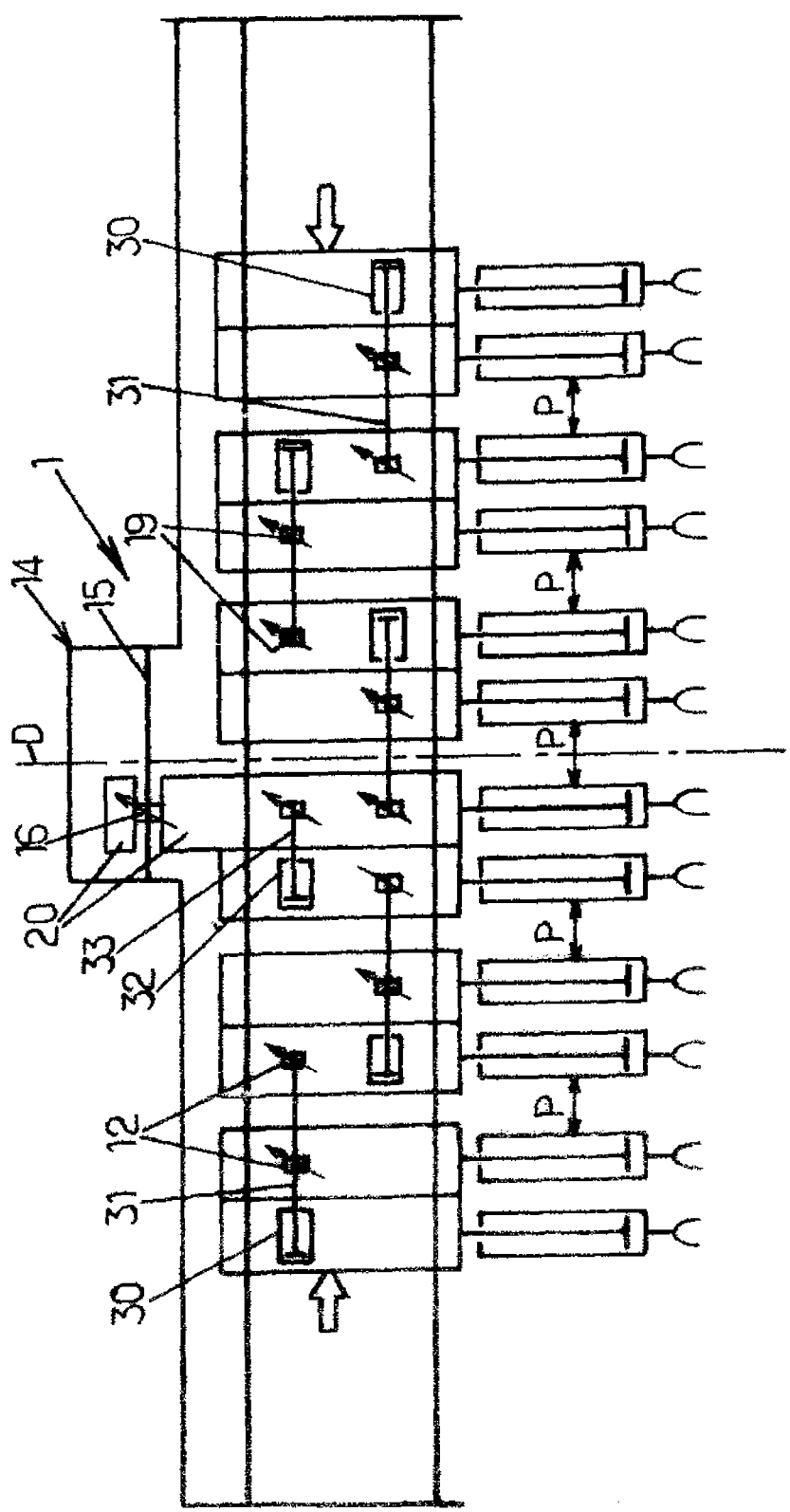
FIG. 8 shows the tool of FIGS. 6 and 7, after adjustment of the tool and after grouping the supports, illustrating the fact that the choice and positioning of the attachment means allow both setting a spacing between the supports and creating groups of products.

FIGS. 6 to 8 will now be referred to while describing another arrangement of the attachment means between the supports 2.

This other arrangement allows creating groups of supports 2 in order to create, for example, batches of products.

FIGS. 6 to 8 show the arrangement of the attachment means 10 which allows creating six groups of two products.

The same references are used in FIGS. 1 to 8 to indicate the same objects.

One will note that the handling tool represented in FIG. 6 is strictly identical to the tool 1 described and illustrated in the preceding figures, except that the attachment means 10 are realized in a slightly different manner.

The attachment means 10 in this embodiment comprise cylinders 30 comprising rods 31 of a length greater than the length of the rods 11 of the cylinders 13 described in the previous example.

The stroke of the cylinders 30 is identical to that of the cylinders 13.

The length of the rods 31 is such that two supports 2 can be affixed to them by means of the locking members 12 (see FIG. 6).

The supports 2 of the tool 1, represented in FIG. 6, are spaced apart from each other in a predetermined spacing by means of the adjustment device 21 described above, and by means of the method as described above.

FIG. 7 illustrates the tool 1 obtained at the end of the adjustment method.

One will note that the supports 2 are arranged in exactly the same manner on rails 3 and 4, with the same distance P between each of the supports 2, compared to the device illustrated in FIG. 5 which comprises substantially different attachment means.

In the context of this particular embodiment, the attachment means 10 connect three supports 2 together. In effect, the body of a cylinder 30 is attached to a first body 6 of one support 2 and the two adjacent supports 2 are affixed to the rod 31 of the cylinder 30.

The support 2 which is affixed to the end of the rod 31 of the cylinder 30, also supports the body of a second cylinder 30 connecting it to two other adjacent supports.

The same is true for each of the series of three supports 2 among all the supports 2 of the tool 1, except for the support 20 fixed to the rail 15 on the frame 14 of the tool 1.

In fact, the support 20 is itself affixed to the ends of two rods 31 and 33 of two cylinders 30 and 32. Cylinder 32 comprises a rod 33 which is shorter than the rod 31 of cylinders 30.

The spacing P between two supports is fixed by the positioning of the locking means on the rods of the cylinders, each support 2 (except for the supports 2 at the ends of the row of supports) being attached to at least one rod 31 of a cylinder 30.

However, the supports 2 which carry the bodies of the cylinders 30, 32 have the possibility of drawing closer to an adjacent support 2, when the rod 31, 33 of the cylinder 30, 32 that it carries enters into the body of the cylinder 30, 32.

The grouping of products, obtained by grouping the supports 2 attached to each other in this manner, is obtained by pushing all the supports 2 towards the axis D of symmetry of the tool 1, as is symbolized by the horizontal arrows in FIG. 8.

The two adjacent supports 2, which are attached to a rod 31 of a same cylinder 30, remain spaced apart by the predetermined spacing P because they are not allowed to move on the rod 31 of the cylinder 30 (because of the locking member 12).

However, the two supports 2 which are adjacent and of which one is attached to the rod 31 of a first cylinder 30 and supports the head of a second cylinder 30, are drawn closer to each other by the entry of the rod 31 into the cylinder 30.

This creates groups of two supports 2, separated by the predetermined spacing P, corresponding to the spacing between the products.

The rod 33 of the cylinder 32 is also inserted into the cylinder 32 when the support 2 adjacent to and connected to the support 20 draws closer to the axis D of the tool.

The groups of two supports 2 are illustrated in FIG. 8.

FIG. 9 illustrates yet another mode of affixing the attachment means 10 to the supports 2. The attachment means 10 comprise cylinders 40 with rods 41 that are even longer than rods 31, to which one or more supports 2 can be affixed.

One will note that certain elements of the supports 2 (such as the cylinders 8, for example) have not been represented in FIG. 9, for easier understanding: FIG. 9a is intended to draw the reader's attention to the attachment means 10 and to the supports 2 moving on the rails 3 and 4, as well as to the obtained groups of three supports 2.

The supports 2 are connected in groups of three to the cylinders 40. The first series of three supports attached to the cylinder 40, at one end of the row of supports 2, is affixed in the following manner: The first support 2 carries the body of the cylinder 40. The last support 2 (in the group of three adjacent supports) is affixed to the end of the rod 41 of the cylinder 40. The intermediate support 2 is not affixed to either the rod 41 or the body 40 of the cylinder.

However, the second support 2 carries the head of a second cylinder 40, comprising a rod 41 to which are affixed the support 2 that is in immediate proximity and the next adjacent support 2.

This creates a first group of four supports 2 in which the first three supports are allowed to move towards the axis D of the tool 1 and to draw closer to one another. However, the two supports 2 attached to the rod 41 of the second cylinder 40 are not allowed to draw closer to one another.

The space between these two supports 2 will define a spacing P separating the sets of three supports 2 which can be obtained by this arrangement of the attachment means 10 (see FIG. 9b).

To create the groups of three supports 2 it is also arranged so that the last two supports of the row (see the last two supports on the right in FIG. 9b) are connected by a cylinder 13, as illustrated in FIGS. 1 to 5, of which the rod 11 is much shorter than that of the cylinders 40. This last rod 13 has the sole purpose of connecting the next-to-last support 2 on the right to the last support 2 on the right.

Figure 10:
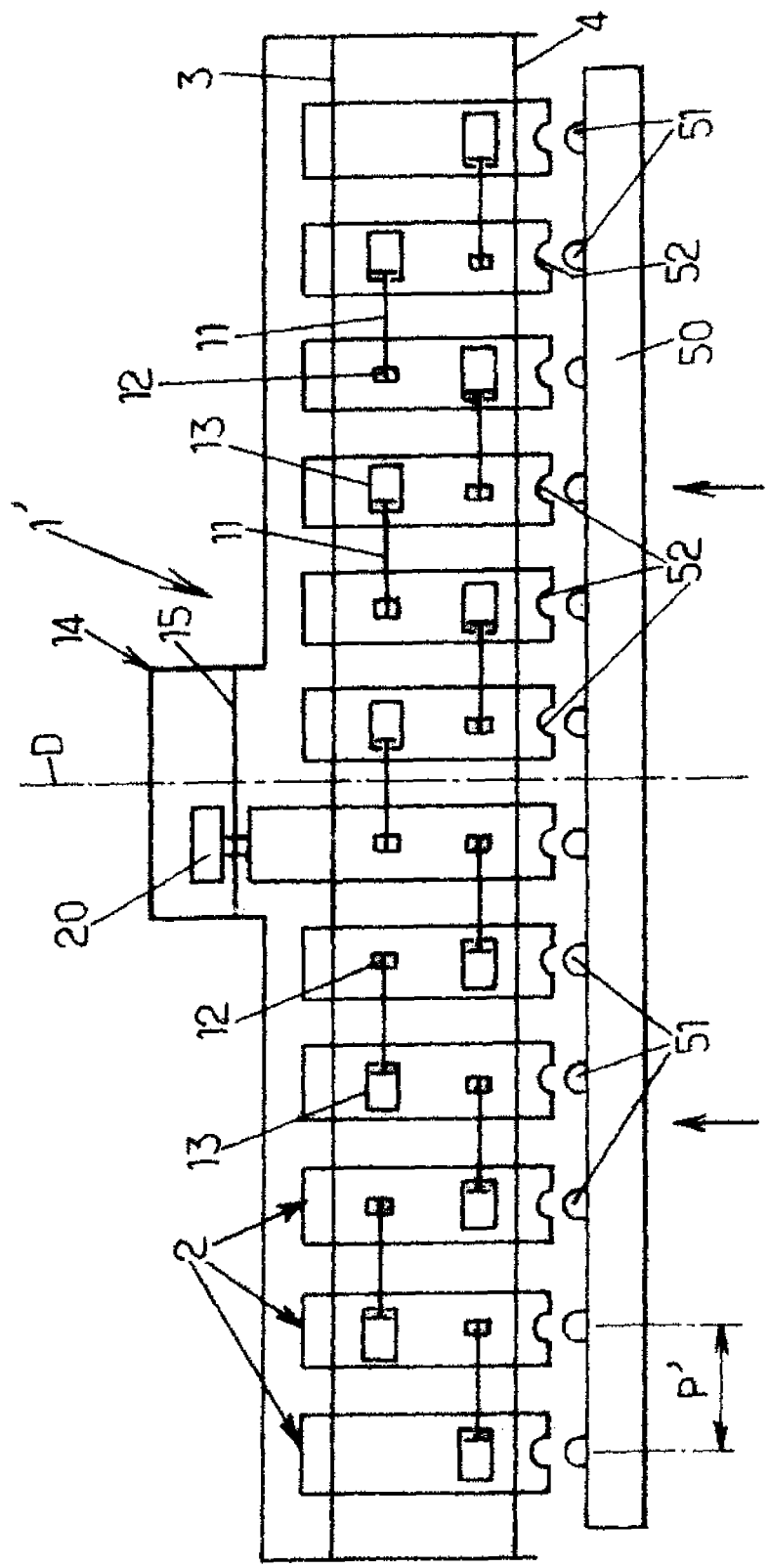
FIG. 10 shows yet another variant implementation of the invention, in a schematic side view with the involvement of a jig.

FIG. 10 will now be referred to while describing another means for adjusting the spacing between two adjacent supports 2.

FIG. 10 illustrates another adjustment device. This is a jig 50 supporting fingers 51 spaced apart from each other by a distance p' corresponding to the distance separating the products to be grasped.

The adjustment method which makes use of this jig 50 consists of placing the jig under the tool 1', then engaging each support 2 with a positioning finger.

Once the supports 2 are placed so they are correctly engaged with the positioning fingers 51 of the jig 50, the locking members 12 are actuated on each of the rods connecting two adjacent supports 2.

The jig is then disengaged.

The tool 1' shown in FIG. 10 has been represented slightly differently than the one represented in the above figures.

The tool 1' comprises supports 2 which can be moved along the rails 3 and 4. The spacing between the supports 2 is adjusted due to the presence, on each of the supports, of a part 52 having a shape complementary to that of the fingers 51 of the jig 50. This example embodiment shows that it is not necessary to have grasping elements 5 in order to adjust the distance between the supports for these elements 5.

To insert the fingers 51 of the jig 50 into the parts 52 of complementary shape, it can be arranged so that the jig 50 is moved relative to the tool 1' without exceeding the scope of a method according to the invention.

One can see from the above description how the handling tool 1 or 1' can be adjusted to separate the supports 2 from each other by a distance which corresponds to the spacing P or p' between the products to be grasped, and how the spaces between the supports 2 can be easily changed due to the attachment means 10, without having to change said supports 2 of the tool 1 or 1', or to create groups of products.

The invention is not limited to the example specifically described for the figures, and extends to the implementation of any equivalent means.

The invention claimed is:

1. Tool for handling and grouping products which are aligned one behind another and which are separated by a given spacing, said tool comprising:
    a row of at least three supports, comprising at least one middle support surrounded by a preceding support and a following support, each able to carry a grasping element for grasping a product, the supports being mounted so as to be able to move on at least one rail, each support being connected to an adjacent support by attachment means,
    the attachment means each comprising a rod connecting two supports, and a locking member for locking the position of at least one of the two supports on the rod,
    the locking member configured to be deactivated in order to adjust the distance between the two supports to said spacing between two products, and
    grouping means comprising at least one first cylinder and at least one second cylinder, each cylinder comprising a body and a rod, the rod of the cylinder being the rod of the attachment means, each support being attached to the body of a cylinder and/or to a locking member of the rod of a cylinder whose body is attached to another support.

2. Tool according to claim 1, wherein at least one of the supports for grasping elements is connected to a frame comprised in the tool.

3. Tool according to claim 2, wherein said at least one support for grasping elements is mounted so as to be able to move relative to said frame, and wherein the tool comprises means for locking in position said at least one support connected to the frame, wherein the means for locking is configured to lock the grasping element to the frame.

4. Tool according to claim 3, wherein said locking means comprise a pneumatic lock.

5. Tool according to claim 1, wherein the supports are mounted to allow them to move transversely to the rail, between an active position and a retracted position, wherein said tool comprises means for locking the supports in the retracted position, and wherein the locking means is configured to lock the grasping means in a retracted position such that the grasping elements cannot grasp the product.

6. Tool according to claim 1, wherein the tool comprises means for grouping at least two supports to form at least two groups of supports.

7. Method for adjusting a tool for handling and grouping products which are aligned one behind another and which are separated by a given spacing, said tool comprising:
    a row of at least three supports, comprising at least one middle support surrounded by a preceding support and a following support, each able to carry a grasping element for grasping a product, the supports being mounted so as to be able to move on at least one rail, each support being connected to an adjacent support by attachment means,
    the attachment means each comprising a rod connecting two supports, and a locking member for locking the position of at least one of the two supports on the rod,
    the locking member configured to be deactivated in order to adjust the distance between the two supports to said spacing between two products, and
    grouping means comprising at least one first cylinder and at least one second cylinder, each cylinder comprising a body and a rod, the rod of the cylinder being the rod of the attachment means, each support being attached to the body of a cylinder and/or to a locking member of the rod of a cylinder whose body is attached to another support,
    said method comprising the following steps:
    a) bringing the supports closer together so they press against each other on each side of the tool axis;
    b) moving at least one positioning finger along a rail facing said tool,
    c) positioning said finger opposite a first support,
    d) moving the tool or the finger substantially vertically such that said finger is engaged with said support,
    e) moving, substantially horizontally, said finger engaged with said support over a predetermined distance along the rail, said distance corresponding to said spacing between two products,
    f) setting said locking member on the rod connecting a support to another adjacent support,
    g) moving the tool or finger vertically to disengage said finger from said support, and by said steps a) to f) being performed for each support.

8. Method according to claim 7, wherein said step c) is first carried out for a support located at an end of the row of supports.

9. Method according to claim 8, wherein the method makes use of two positioning fingers, the two fingers moving symmetrically on said rail relative to an axis of said tool.

10. Method for adjusting a tool for handling and grouping products which are aligned one behind another and which are separated by a given spacing, said tool comprising:
    a row of at least three supports, comprising at least one middle support surrounded by a preceding support and a following support, each able to carry a grasping element for grasping a product, the supports being mounted so as to be able to move on at least one rail, each support being connected to an adjacent support by attachment means, the attachment means each comprising a rod connecting two supports, and a locking member for locking the position of at least one of the two supports on the rod, the locking member configured to be deactivated in order to adjust the distance between the two supports to said spacing between two products, grouping means comprising at least one first cylinder and at least one second cylinder, each cylinder comprising a body and a rod, the rod of the cylinder being the rod of the attachment means, each support being attached to the body of a cylinder and/or to a locking member of the rod of a cylinder whose body is attached to another support, and wherein the tool comprises means for grouping at least two supports to form at least two groups of supports, said method implying the use of a jig comprising as many positioning fingers as said tool comprises supports for grasping elements, and by said adjustment being implemented by said following steps:

i) placing the jig under said tool,
ii) engaging each respective support with a corresponding positioning finger of the jig,
iii) setting locking members on each of the rods connecting two supports,
iv) disengaging the jig.

11. Installation comprising a tool for handling and grouping products which are aligned one behind another and which are separated by a given spacing, said tool comprising:

a row of at least three supports, comprising at least one middle support surrounded by a preceding support and a following support, each able to carry a grasping element for grasping a product, the supports being mounted so as to be able to move on at least one rail, each support being connected to an adjacent support by attachment means, the attachment means each comprising a rod connecting two supports, and a locking member for locking the position of at least one of the two supports on the rod, the locking member configured to be deactivated in order to adjust the distance between the two supports to said spacing between two products, and grouping means comprising at least one first cylinder and at least one second cylinder, each cylinder comprising a body and a rod, the rod of the cylinder being the rod of the attachment means, each support being attached to the body of a cylinder and/or to a locking member of the rod of a cylinder whose body is attached to another support.

12. Installation according to claim 11, additionally comprising an adjustment device for adjusting said tool.

* * * * *